(12) United States Patent
Gupta

(10) Patent No.: US 12,271,393 B2
(45) Date of Patent: Apr. 8, 2025

(54) UNIFIED CLOUD STORAGE DATA PROCESSING FRAMEWORK FOR MULTI-SOURCE SYSTEMS

(71) Applicant: SAP SE, Walldorf (DE)

(72) Inventor: Sagar Gupta, Kalka (IN)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 17/741,671

(22) Filed: May 11, 2022

(65) Prior Publication Data

US 2023/0367786 A1 Nov. 16, 2023

(51) Int. Cl.
*G06F 16/245* (2019.01)
*G06F 9/54* (2006.01)
*G06F 16/25* (2019.01)

(52) U.S. Cl.
CPC ............ *G06F 16/258* (2019.01); *G06F 9/547* (2013.01); *G06F 16/245* (2019.01)

(58) Field of Classification Search
CPC ....... G06F 16/258; G06F 16/245; G06F 9/547
See application file for complete search history.

(56) References Cited

U.S. PATENT DOCUMENTS

| | | | | |
|---|---|---|---|---|
| 10,089,389 B1* | 10/2018 | Van Rotterdam | ... | G06F 16/3329 |
| 10,592,472 B1* | 3/2020 | Jarasius | ............. | G06F 16/1794 |
| 11,695,627 B1* | 7/2023 | Fink | .................. | H04L 41/0856 |
| | | | | 709/221 |
| 12,067,358 B1* | 8/2024 | Atallah | ................. | G06F 40/177 |
| 2008/0082480 A1* | 4/2008 | Gounares | .............. | G06F 16/258 |
| 2008/0082601 A1* | 4/2008 | Meijer | ............... | G06Q 30/0633 |
| | | | | 707/E17.006 |
| 2013/0304499 A1* | 11/2013 | Rangadass | ..... | G06Q 10/063114 |
| | | | | 705/2 |
| 2014/0006244 A1* | 1/2014 | Crowley | ................ | G06Q 40/04 |
| | | | | 705/37 |
| 2014/0337429 A1* | 11/2014 | Asenjo | .................... | H04L 67/10 |
| | | | | 709/204 |
| 2015/0134734 A1* | 5/2015 | Bishop | .................. | H04L 67/303 |
| | | | | 709/203 |
| 2016/0306929 A1* | 10/2016 | Butka | .................... | G16H 10/60 |
| 2018/0052451 A1* | 2/2018 | Billi-Duran | ...... | G05B 19/41835 |
| 2018/0275902 A1* | 9/2018 | Monday | ................ | G06F 3/0632 |
| 2019/0238656 A1* | 8/2019 | Samprathi | ............ | G06F 3/0661 |
| 2019/0362014 A1* | 11/2019 | Ikhlaq | ................. | G06F 16/9024 |

(Continued)

*Primary Examiner* — Alicia M Willoughby
(74) *Attorney, Agent, or Firm* — Buckley, Maschoff & Talwalkar LLC

(57) ABSTRACT

Embodiments may be associated with a unified data processing framework. A first source system may contain first data associated with a first Application Programming Interface ("API") specification, and a second source system may contain second data associated with a second API specification (different from the first API specification). A cloud system processing layer may receive the first data and the second data and parse the first data and the second data to capture entity metadata. The first data and the second data can then be converted into a universal and extendable data format having nodes arranged in accordance with the metadata. The converted first and second data is stored by the cloud system processing layer in cloud storage. A data retrieval engine may then retrieve information from the cloud storage (including information associated with both the first and second data) in response to a user query.

15 Claims, 13 Drawing Sheets

(56) References Cited

U.S. PATENT DOCUMENTS

| | | | |
|---|---|---|---|
| 2021/0342334 A1* | 11/2021 | Wu | G06F 16/1837 |
| 2022/0236697 A1* | 7/2022 | Stump | G06F 8/71 |
| 2022/0269552 A1* | 8/2022 | Bendelac | G06F 16/252 |
| 2023/0199746 A1* | 6/2023 | Vannithamby | G06N 7/01 |
| | | | 370/452 |
| 2023/0259518 A1* | 8/2023 | Renick | G06F 21/6218 |
| | | | 707/602 |

* cited by examiner

UNIFIED CLOUD STORAGE DATA PROCESSING FRAMEWORK FOR MULTI-SOURCE SYSTEMS

TECHNICAL FIELD

Some embodiments generally relate to methods and systems for use with computer devices, including networked computing devices. More particularly, some embodiments relate to the use of a unified cloud storage data processing framework for multi-source systems in a cloud computing environment.

BACKGROUND

An enterprise may implement applications using on-premises and/or cloud computing environments. For example, a business might have applications to processes purchase orders, handle human resources functions, provide financial information, etc. Such applications may be associated with multiple source systems that use various Application Programming Interface ("API") specifications, such as Open Data Protocol ("OData") V2, OData 4, Hyper-Text Transfer Protocol ("HTTP"), etc. For example, different API specifications might be related to data stored in connection with legacy on-premises systems that now needs to be access via a cloud computing environment. Being able to efficiently query and/or combine information from such source systems can be an inefficient and difficult task—especially when a large amount of data and/or a substantial number of API specifications are involved.

Thus, it would be desirable to provide a unified cloud storage data processing framework for multi-source systems in a cloud computing environment.

SUMMARY OF THE INVENTION

According to some embodiments, systems, methods, apparatus, computer program code and means are provided to accurately and/or automatically a unified cloud storage processing framework for multi-source systems in a way that provides fast and useful results and that allows for flexibility and effectiveness when reacting to those results.

Some embodiments are directed to a unified data processing framework. A first source system may contain first data associated with a first Application Programming Interface ("API") specification, and a second source system may contain second data associated with a second API specification (different from the first API specification). A cloud system processing layer may receive the first data and the second data and parse the first data and the second data to capture entity metadata. The first data and the second data can then be converted into a universal and extendable data format having nodes arranged in accordance with the metadata. The converted first and second data is stored by the cloud system processing layer in cloud storage. A data retrieval engine may then retrieve information from the cloud storage (including information associated with both the first and second data) in response to a user query Some embodiments comprise: means for receiving, by a computer processor of a cloud system processing layer from a first source system, first data associated with a first Application Programming Interface ("API") specification; means for receiving, by the computer processor of the cloud system processing layer from a second source system, second data associated with a second API specification, different from the first API specification; means for parsing the first data and the second data to capture entity metadata; means for converting the first data and the second data into a universal and extendable data format having nodes arranged in accordance with the metadata; means for storing the converted first and second data in cloud storage; and means for retrieving information from the cloud storage, including information associated with both the first and second data, responsive to a user query from a data retrieval engine.

In some embodiments, a communication device associated with a back-end application computer server exchanges information with remote devices in connection with an interactive graphical user simulation interface. The information may be exchanged, for example, via public and/or proprietary communication networks.

A technical effect of some embodiments of the invention is an improved and computerized way to accurately and/or automatically a unified cloud storage processing framework for multi-source systems in a way that provides fast and useful results. With these and other advantages and features that will become hereinafter apparent, a more complete understanding of the nature of the invention can be obtained by referring to the following detailed description and to the drawings appended hereto.

BRIEF DESCRIPTION OF DRAWINGS

The present disclosure is illustrated by way of example and not limitation in the following figures.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many traditional business processing systems are now adopting a cloud native paradigm and opening APIs for external communication. A substantial challenge faced by consuming applications and systems that the technical APIs are often implemented in various proprietary and standard specifications, such as database-oriented OData V2, OData V4, HTTP oriented Representational State Transfer ("REST") specifications, the remote procedure-oriented Simple Object Access Protocol ("SOAP"), etc. Moreover, systems and cloud applications using HTTP/2 and/or HTTP/3 may utilize features such as push requests and/or request multiplexing over long running stateful connections. With such functionality enabled from source systems, consumers can access additional information related to a current context and should be able to receive, process, and store this additional information (leading to better communications).

Also note that collaborative system may provide improved technical integration by using relatively easy to consume business API interfaces. For example, when data coming from different source systems needs to be collectively processed and harmonized, the multiple data formats and structures associated with the source systems can introduce overhead associated with: representing the data in a base format; and updating the data to handle mashup and/or collaborative scenarios. That is, each time a User Interface ("UI") node needs to either update or view the data it must either parse or use wrappers around the data being fed by different source systems (which may increase system latency and degrade the overall user experience).

Figure 1:
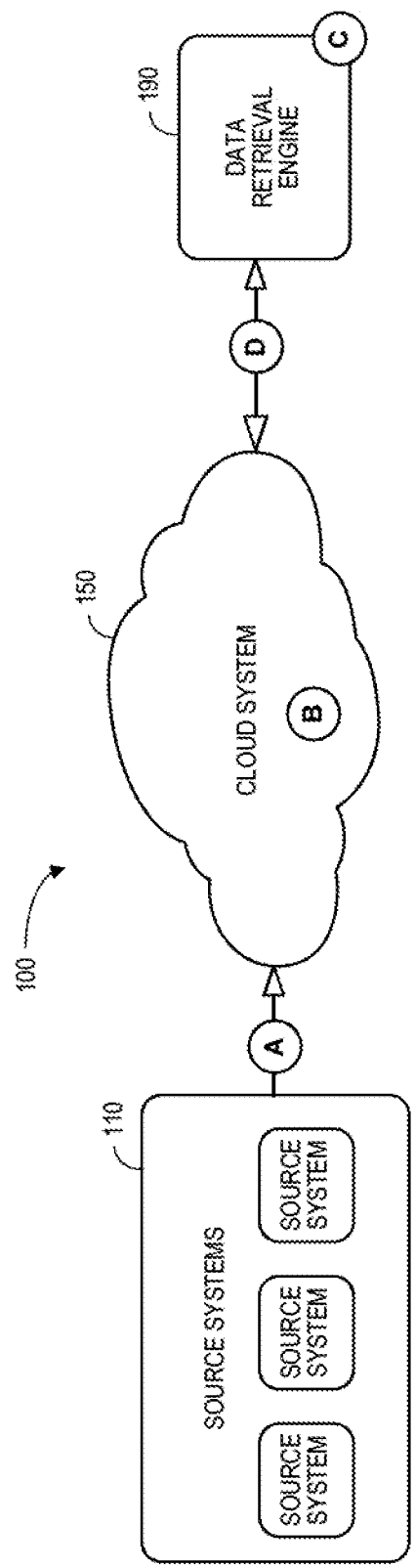
FIG. 1 is a high-level block diagram of a system in accordance with some embodiments.

To avoid such drawbacks, FIG. 1 is a high-level block diagram of a system 100 according to some embodiments. At (A), multiple source systems 110 provide data to a cloud system 150. For example, a first source system 110 may contain first data associated with a first API specification while a second source system 110 contains second data associated with a second API specification (different from the first API specification). At (B), the cloud system 150 may receive the first data and the second data and automatically parse the first data and the second data to capture entity metadata. A used herein, the term "automatically" may refer to a device or process that can operate with little or no human interaction. The cloud system 150 may also convert the first data and the second data into a universal and extendable data format having nodes arranged in accordance with the metadata and store the converted first and second data in cloud storage. At (C), a data retrieval engine 190 may receive a user query (e.g., asking for financial information from multiple source systems 110) and retrieve information from the cloud storage at (D)—including information associated with both the first and second data—in response to the user query.

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., cloud storage), which may be co-located or remote from the data retrieval engine 190. Although a single data retrieval engine 190 is shown in FIG. 1, any number of such devices may be included. Moreover, various devices described herein might be combined according to embodiments of the present invention. Some or all of the system 100 functions may be performed by a constellation of networked apparatuses, such as in a distributed processing or cloud-based architecture.

A cloud operator or administrator may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various source system mappings, business logic rules, etc.) and/or receive automatically generated statistics, recommendations, results, and/or alerts from the system 100.

Figure 2:
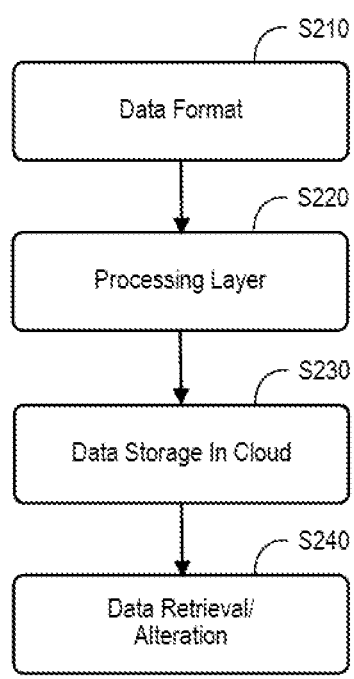
FIG. 2 illustrates a method according to some embodiments.

FIG. 2 illustrates a user simulation method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, the system may implement a data format. For example, a computer processor of a cloud system processing layer may receive: first data associated with a first API) specification from a first source system; and second data associated with a second API specification (different from the first API specification) from a second source system. The system may then parse the first data and the second data to capture entity metadata and convert the first data and the second data into a universal and extendable data format (e.g., having nodes arranged in accordance with the metadata). According to some embodiments, a universal and extendible data format, supported with an efficient processing layer, may help focus on data handling at scale.

At S220 a processing layer may be used, and data storage can then be provided via a cloud computing environment at S230. For example, the system may store the converted first and second data in cloud storage. The cloud storage may represent, according to some embodiments, a cloud native multi-modal data store that provides efficient querying based on data variety. At S2440, data retrieval and/or alteration may be performed. For example, the system may retrieve information from the cloud storage (including information associated with both the first and second data) responsive to a user query from a data retrieval engine.

Figure 3:
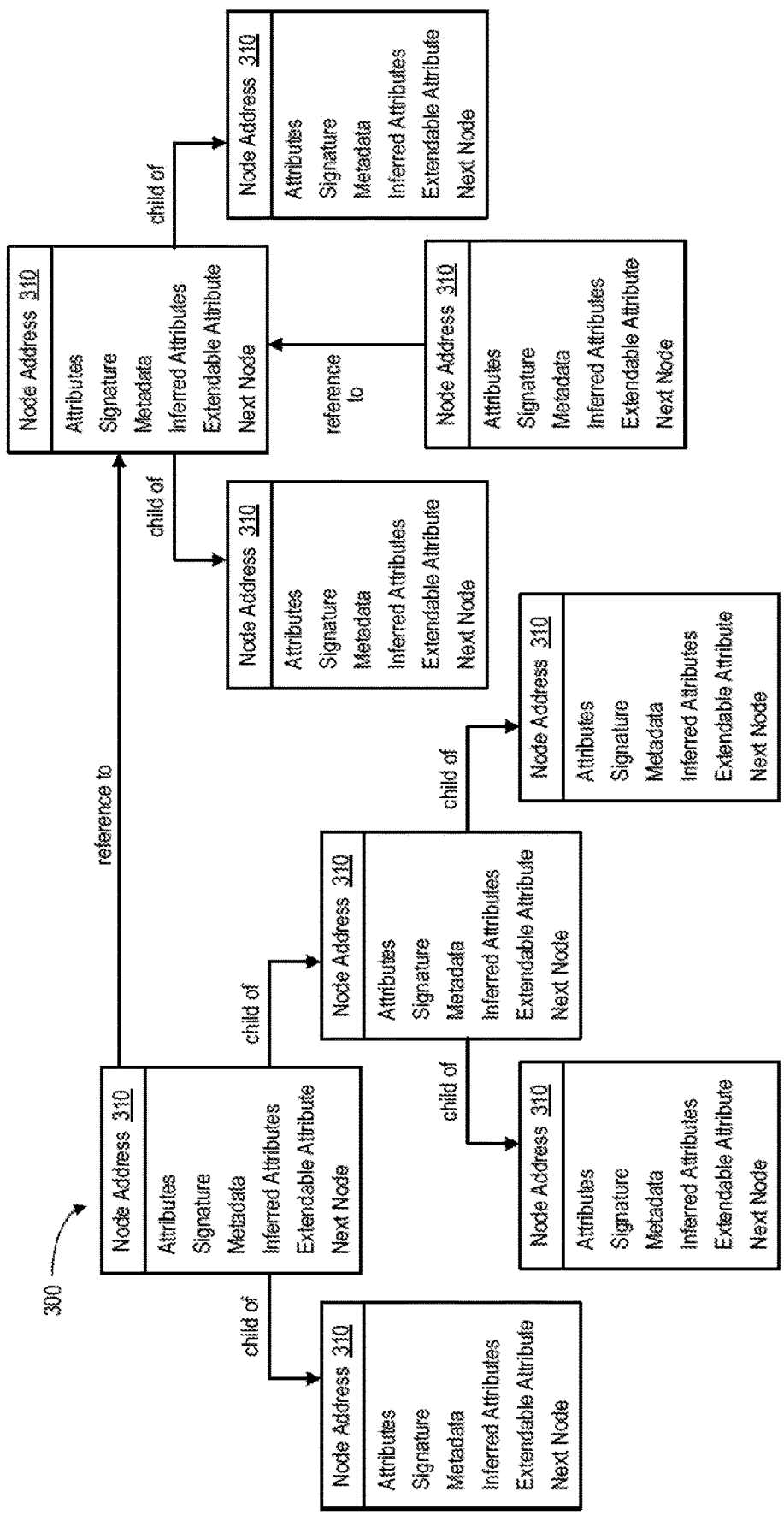
FIG. 3 is a data format tree in accordance with some embodiments.

By adopting a universal and extendible data format, consumers can understand various attributes containing key information about a business entity as it is received from the source systems. For example, FIG. 3 is a data format tree 300 in accordance with some embodiments. With a standardized data format, information and metadata can be captured, and semantic information can be inferred using Machine Learning ("ML") techniques. This information can be further enhanced with additional configuration layer and custom domain-centric analytical models. With such self-learned, out-of-box, and configurable sematic understandings consumers can perform meaningful queries and support business-oriented mashup scenarios with data that originates from varied back-end system (and this can support business workflows across multiple source systems).

According to some embodiments, the proposed data structure tree 300 design (for information that comes from different source systems) is represented as nodes 310. Some nodes 310 may be parents of other child nodes 310 (which in turn might be a parent of still other nodes 310). Other nodes 310 may reference nodes 310 without having a parent/child relationship. As shown in FIG. 3, each node 310 may include a node address or identifier and entity attributes (e.g., the attributes and values received from source systems). Each node 310 may also include a change hash or signature (e.g., a signature to efficiently compare and process entity nodes 310). According to some embodiments, each node 310 may include metadata (e.g., semantic information about entity attributes, data types, value ranges, etc.), inferred attributes (e.g., attributes inferred during data processing using sematic and/or ML models), and/or extendible attributes (e.g., provisional fields that allow for extensions and the storage of additional information). In some embodiments, a node 310 may include information about related nodes with relation type (e.g., a "next node" indication) for related or similar nodes 310 that are received from source systems and inferred using the semantic and/or ML models.

Figure 4:
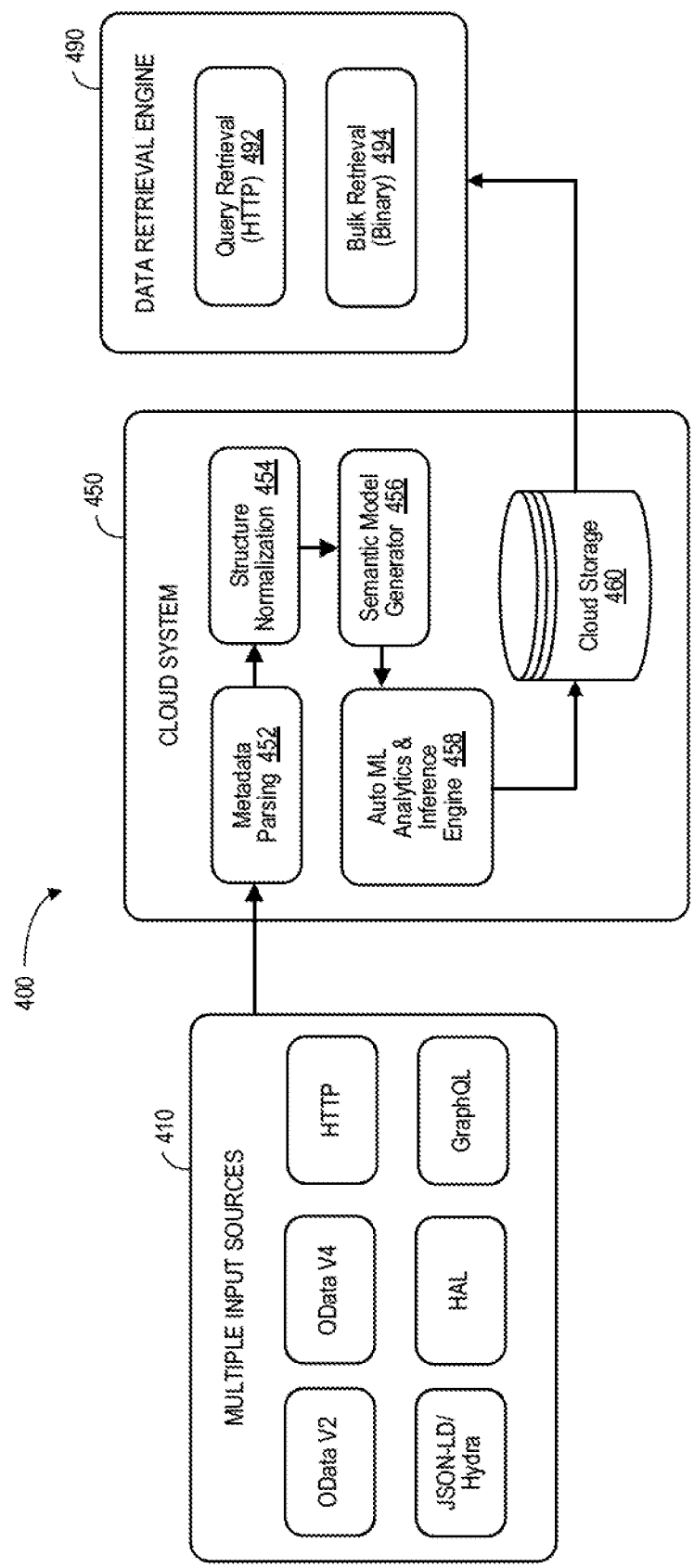
FIG. 4 is a more detailed system in a cloud computing environment according to some embodiments.

In this way, database oriented and HTTP oriented API systems may be supported by a well-defined metadata or semantic definitions of the exposed entities. Furthermore, such systems may expose a well-defined query interface, connected, and referenced entities such as REST architecture Hypermedia as the Engine of Application State ("HATEOAS") which can be utilized while receiving the data from source systems (e.g., to perform efficient data mashups). FIG. 4 is a more detailed system 400 in a cloud computing environment according to some embodiments. The system 400 may receive as inputs, for example, data about business systems, APIs, connectors, integration points, etc. The system 400 includes multiple input sources 410 which might include, by way of examples, OData V2, OData V4, HTTP"), JavaScript Object Notation ("JSON")-Linked Data ("LD") with Hydra, Hypertext Application Language ("HAL"), Graph Query Language ("GraphQL"), remote procedure-oriented SOAP, etc. Data from the multiple input sources 410 may be provided to metadata parsing 452 in a cloud system 450. The metadata parsing 452 may provide information to a semantic model generator 456 via structure normalization 454. After being processed by an automated ML analytics and inference engine 458 the final representation may be stored in cloud storage 460. A data retrieval engine 490 may then (e.g., via HTTP query retrieval 492 and/or binary bulk retrieval 494) access the information from cloud storage 460 as appropriate.

Figure 5:
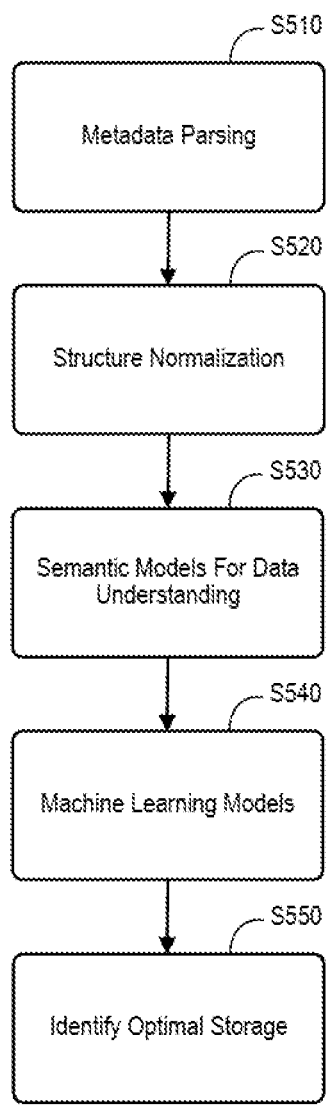
FIG. 5 is a processing layer method in accordance with some embodiments.

FIG. 5 is a processing layer method in accordance with some embodiments. At S510, metadata parsing may parse metadata that describes an entity from a source system. At S520, structure normalization may perform mapping to an internal node structure based on the entity metadata. At S530, semantic models may provide for data understanding by processing an entity through specialized models based on different data types (e.g., transactional and operational, unstructured, time series, analytical, etc.). At S540, ML models may process the entity to generate analytics and inferences based on automated learning ML algorithms. At S550, an optimal storage may be identified to persist processed data based on an optimal representation that is available in a multi-modal data store. Note that with advances in storage technologies, enterprise data lakes may support multi-modal storages which can be used to efficiently store and query different types of data, such as transactional, operational, time series, unstructured, etc.

Figure 6:
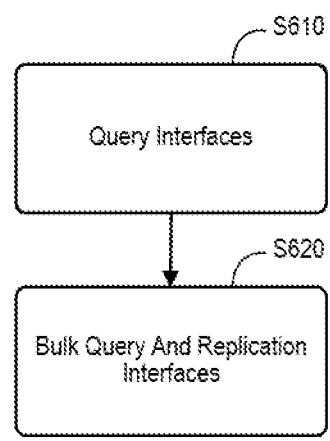
FIG. 6 is a data retrieval method according to some embodiments.

After the optimal storage is identified, the data may be accessed. For example, FIG. 6 is a data retrieval method according to some embodiments. At S610, query interfaces may be used for data retrieval and/or a realization of mashup and analytical techniques. According to some embodiments, an advanced query interface may be provided with integration for a ML workbench to build domain specific analytical and ML models. At S620, bulk query and replication interfaces (e.g., associated with binary protocols and/or HTTP/2, HTTP/3 protocols) for use with system replication and synchronization over binary protocols.

Thus, embodiments may provide a processing and query framework to store received data in a cloud-based data store that matches the nature and query profiles for the type of data. This may utilize a well-integrated profile of cloud and on-premises, hot and cold stores to give cost effective storage and optimal query performance based on business requirements.

Figure 7:
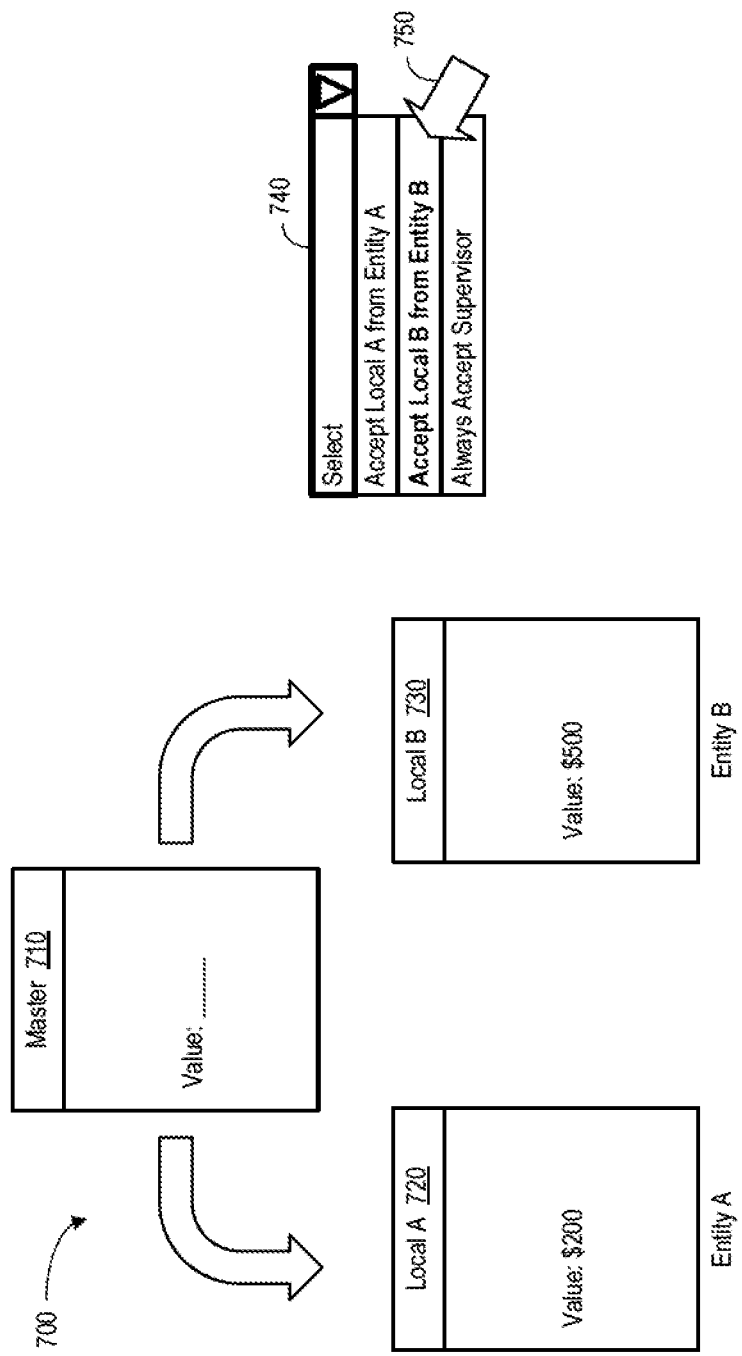
FIG. 7 illustrates collaborative editing in accordance with some embodiments.

According to some embodiments, the framework can act as a foundation to provide configurable business actions to customers. Customers can then use the framework to create actions/processes to invoke any SOAP/REST APIs (e.g., provided by software vendors) without worrying about data transformation and data exchange problems. As used herein, the phrase "collaborative editing" may refer to editing by groups who produce works together through individual contributions (e.g., textual documents, spreadsheets, programmatic source code, etc.). In collaborative editing, a UI node working on the data may need to be synchronized with back-end information. For example, FIG. 7 illustrates 700 collaborative editing in accordance with some embodiments. As shown, a master document 710 (e.g., at a back-end) may be simultaneously edited as a local A document 720 (by entity A) and a local B document 730 (by entity B). When edits conflict (e.g., entity A enters "$200" for a particular value while entity B enters "$500" for that same value), a UI element 740 may be used to select (e.g., via touchscreen or computer mouse pointer 750) could be used to select a change, select a rule to be applied, etc.

In this way, the system may create local and master copies of information for a data structure, and when data is updated, a delta may be computed in comparison with the master copy. The computed delta can then be passed to all UI nodes—which can result in merges or conflicts in subsequent UI nodes. Because the extent of change is limited to one node in the tree, the computation of conflicts can be achieved by using the change hash or signature of a node (and the associated hierarchy). The user can then be provided with options (e.g., to either accept or reject the changes). When a save is triggered for any node, the back-end may transmit the new master copy (with updated signatures) via web sockets, server-side events, or push notifications to all of the UI nodes and the same comparison can be done (with changes being shown to the user). In this way, collaborative editing may be achieved without limited the system to a minimum unit of work as is typically done.

According to some embodiments, data representation information may come from different source system and be converted into m-ary tree which to hold the information from all the source systems in hierarchical form. This tree can then be used to traverse and represent the data and to update the node information.

According to some embodiments, serialization and/or deserialization on a service mesh may be associated with textual and/or binary format. As used herein, the term "serialization" may refer to a process of converting an object into a stream of bytes to store the object or transmit it to memory, a database, or a file (e.g., to save the state of an object so it can be recreated when needed). The term "deserialization" may refer to the reverse process.

Figure 8:
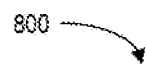
FIG. 8 illustrates a phone book application according to some embodiments.

Consider the example of a simple "phone book" application that can read and write people's contact details to and from a file. Each person in the address book may have a name, an identifier, an email address, and a contact phone number. For example, FIG. 8 illustrates 800 a phone book 810 application according to some embodiments. In this situation, there may be several ways to serialize and retrieve structured data such as the phone book 810.

One approach would be to use serialization. This may represent a default approach because it is built into the language, but it has several well-known problems. Serialization may not work very well when data needs to be shared with applications written in any high-level programming language or in distributed systems.

Another approach is to use an ad-hoc way to encode the data items into a single string—such as encoding four integers as "12:3: –23:67". This is a simple and flexible approach, although it may require writing one-off encoding and parsing code (and the parsing may impose a small run-time cost). This approach works best for encoding relatively simple data.

Still another approach would be to serialize the data to XML/JSON. This approach can be attractive because XML/JSON is (generally) human readable and there are client libraries for many programming languages. This can therefore be a good choice to share data with other applications or projects. However, human readable format can be space intensive, and encoding/decoding it can impose a substantial performance penalty on applications. Also, navigating an XML Document Object Node ("DOM")/JSON tree can be considerably more complicated as compared to navigating simple fields in a class.

Binary formats are a flexible, efficient, and automated approach to solve this problem. Hence, some embodiments may transform the data into binary format which can then be shared to distributed systems and to other high-level programming languages. Because the data is transferred in binary format, this approach also reduces the data volume that is transferred which results in efficient compression. And since the data is transferred in binary format, this approach also makes data transfer more secure as compared to textual data transmission (e.g., the data can be divided smaller packets and the packets can transferred in randomized fashion—which is only known by the sender and receiver).

Figure 9:
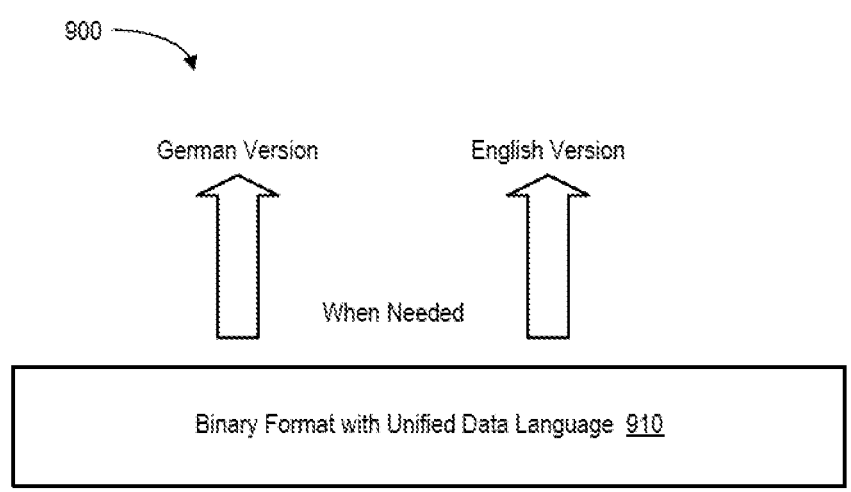
FIG. 9 illustrates on-demand conversion from binary to human readable format according to some embodiments.

According to some embodiments, an application may use an OData Entity Data Model ("EDM") representation for data visualization. In this case, the system can apply the same concept to adapt efficient OData transformation which will convert the data transmitted from a UI into binary format at the back-end. Similarly, from back-end the data transmitted can be transformed into UI elements. This kind of data transmission will bring faster and optimized data transmission because a text-to-byte conversion in the data layer is not required. For example, FIG. 9 illustrates 900 on-demand conversion from binary format (with a unified data language) 910 into human readable format according to some embodiments. In particular, the data stored in binary format 910 until it is needed to be read, at which point it can be translated into a human readable German version of a UI. If it is later needed for another reason, the binary format 910 might then be translated into an English version of the UI.

By using a schema representation (or alternatively utilizing the reflection provided by binary message classes), embodiment may deserialize the messages (and iterate over the fields provided) and manipulate values on the fly without writing code against any specific message type. One useful way to use schema representation and reflection is to convert binary messages to (and from) other commonly used readable representations such as XML or JSON. A more advanced use might be to find differences between two messages of the same type, or to develop a sort of "regular expressions for binary messages" in which users can write expressions that match certain message contents. For example, this technique can help the system consume a standardized representation (e.g., OData) provided by SAP® HANA (and other business systems) directly in middleware or micro-frontends without generating service stubs.

Figure 10:
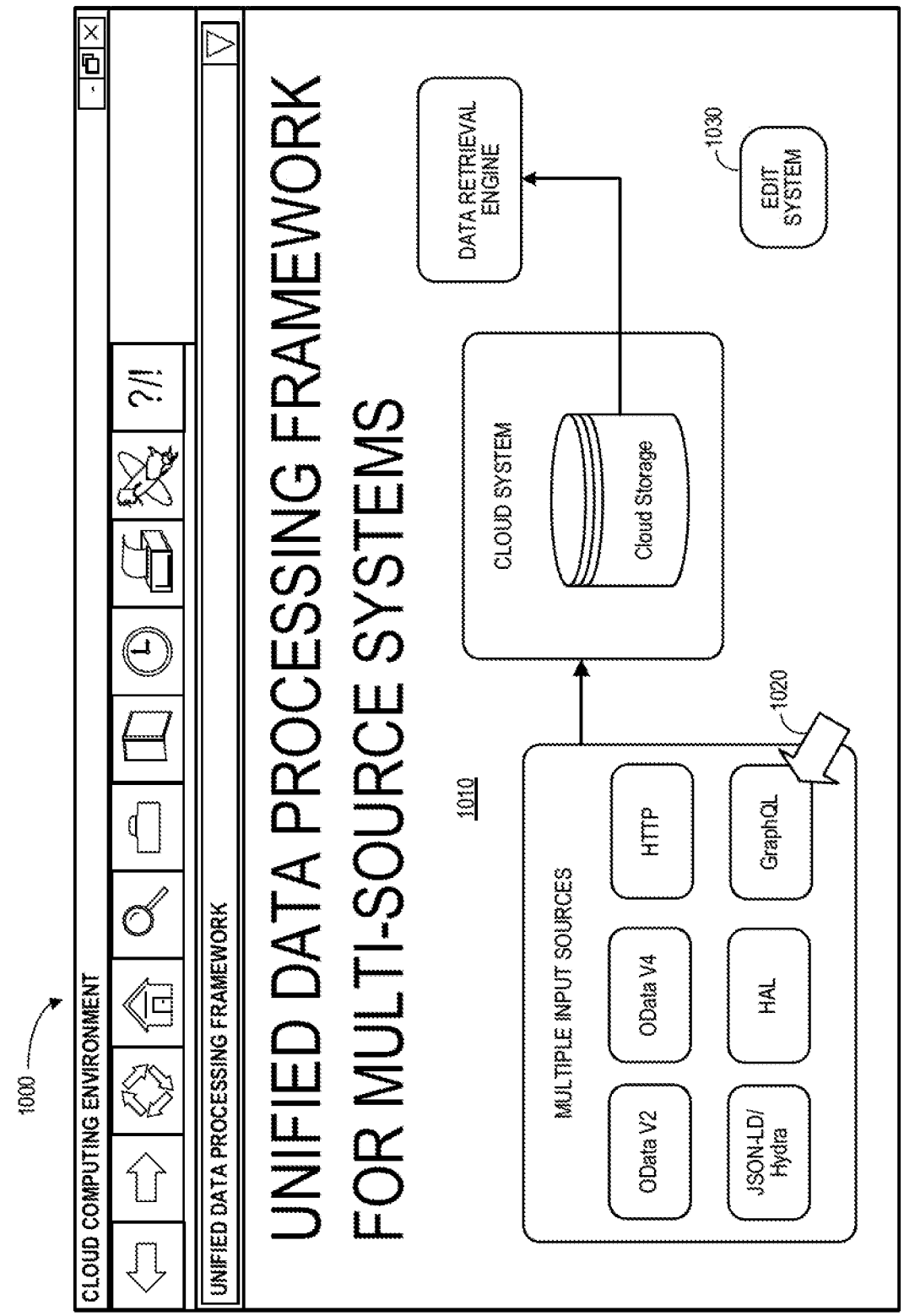
FIG. 10 is a human machine interface display in accordance with some embodiments.

FIG. 10 is a human machine interface operator or administrator display 1000 in accordance with some embodiments. The display 1000 includes a graphical representation 1010 or dashboard that might be used to manage or monitor a unified data processing framework for multi-source system (e.g., associated with a cloud computing environment). In particular, selection of an element (e.g., via a touchscreen or computer mouse pointer 1020) might result in the display of a popup window that contains configuration data. The display 1000 may also include a user selectable "Edit System" icon 1030 to request system changes (e.g., to update mappings, collaborative editing rules, etc.).

Figure 11:
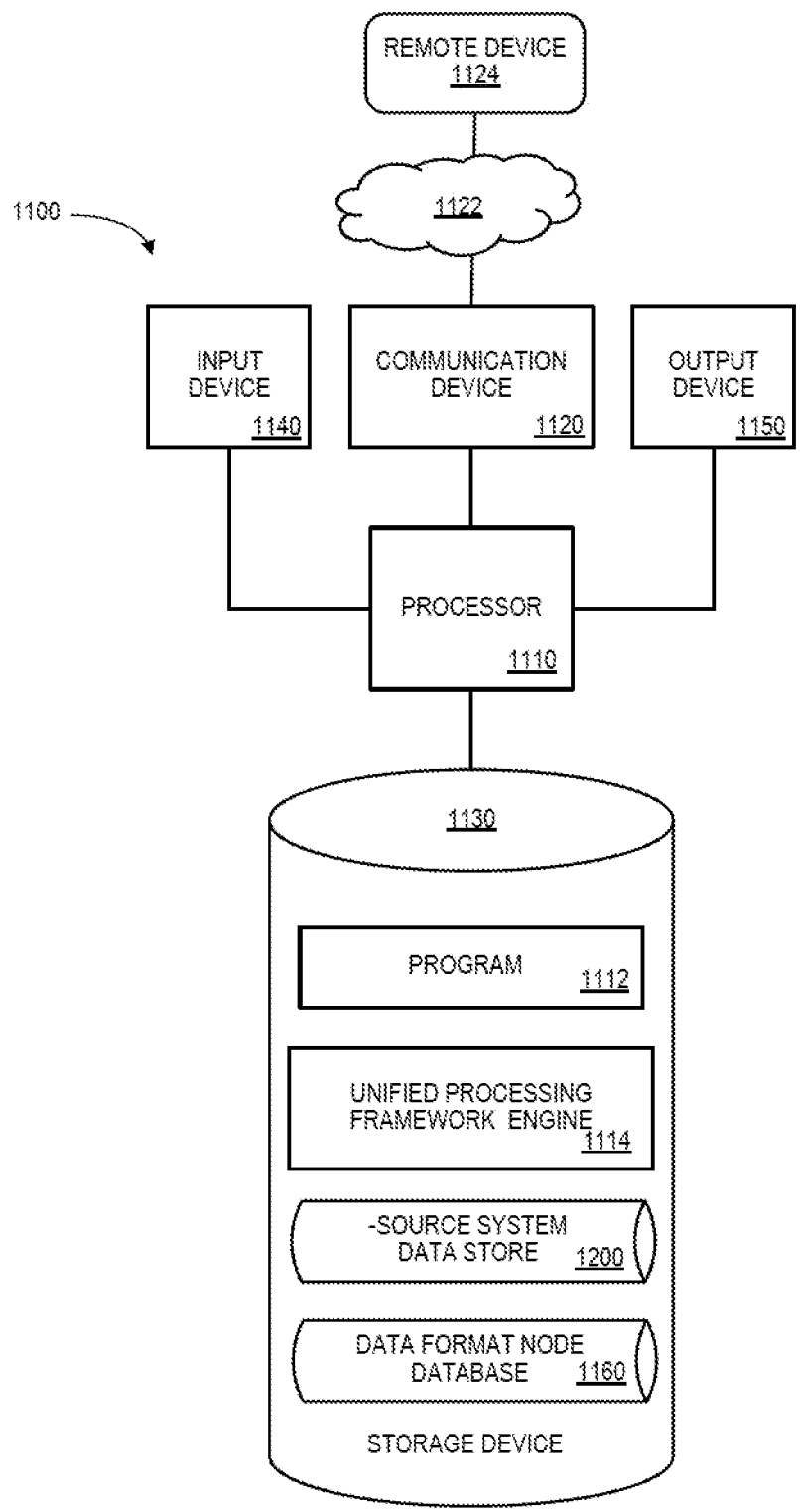
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the systems 100, 400 of FIGS. 3 and 4 respectively (and/or any other system described herein). The platform 1100 comprises a processor 1110, such as one or more commercially available CPUs in the form of one-chip microprocessors, coupled to a communication device 1120 configured to communicate via a communication network 1122. The communication device 1120 may be used to communicate, for example, with one or more remote devices 1124 (e.g., to report collected statistics, implement a data source, etc.) via a communication network 1122. The platform 1100 further includes an input device 1140 (e.g., a computer mouse and/or keyboard to input data about model training and/or historic user and product information) and an output device 1150 (e.g., a computer monitor to render a display, transmit recommendations or alerts, and/or create monitoring reports). According to some embodiments, a mobile device and/or PC may be used to exchange data with the platform 1100.

The processor 1110 also communicates with a storage device 1130. The storage device 1130 can be implemented as a single database or the different components of the storage device 1130 can be distributed using multiple databases (that is, different deployment data storage options are possible). The storage device 1130 may comprise any appropriate data storage device, including combinations of magnetic storage devices (e.g., a hard disk drive), optical storage devices, mobile telephones, and/or semiconductor memory devices. The storage device 1130 stores a program 1112 and/or a unified processing framework engine 1114 for controlling the processor 1110. The processor 1110 performs instructions of the programs 1112, 1114, and thereby operates in accordance with any of the embodiments described herein. For example, the processor 1110 may receive first data and second data (from different data sources) and parse the first data and the second data to capture entity metadata. The first data and the second data can then be converted by the processor 1110 into a universal and extendable data format having nodes arranged in accordance with the metadata. The converted first and second data is stored by the processor 1110 in in cloud storage. A data retrieval engine can then retrieve information from the cloud storage (including information associated with both the first and second data) in response to a user query The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, data may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a data format node database 1160 and a source system data store 1200. An example of a database that may be used for the platform 1100 will now be described in detail with respect to FIG. 12. Note that the database described herein is only one example, and additional and/or different data may be stored therein. Moreover, various databases might be split or combined in accordance with any of the embodiments described herein.

Figure 12:
FIG. 12 illustrates a source system data store in accordance with some embodiments.

Referring to FIG. 12, a table is shown that represents the source system data store 1200 that may be stored at the platform 1100 according to some embodiments. The table may include, for example, entries identifying on-premises legacy computing systems that are be accessed by applications in a cloud computing environment. The table may also define fields 1202, 1204, 1206, 1208, 1210 for each of the entries. The fields 1202, 1204, 1206, 1208, 1210 may, according to some embodiments, specify: a source system identifier 1202, an API standard 1204, a date format tree 1206, cloud storage information 1208, and query (status) 1210. The source system data store 1200 may be created and updated, for example, when new on-premises systems are added, when new data retrieval queries are received, etc.

The source identifier 1202 might be a unique alphanumeric label or link that is associated with an on-premises legacy data store. The API standard might indicate, for example, that the source system stores data using OData, JSON, HTTP, SOAP, etc. The data format tree 1206 may comprise node arranged in a hierarchy, with each node containing attributes, metadata, etc. according to any of the embodiments described herein. The cloud storage information 1208 may indicate where information from the source systems (in accordance with the data format tree 1206) are stored in the cloud computing environment. The query (status) 1210 might indicate a request received from a data retrieval engine (e.g., an HTTP query retrieval or a binary format bulk retrieval) along with an indication that the response is in process, has been completed, etc.

In this way, embodiments may improve the handling of data from multiple source systems. By way of example only (and without limiting any of the embodiments described herein), consider the automotive industry which is changing dramatically. New business models (e.g., direct sales and subscriptions) are entering the markets, and Original Equipment Manufacturers ("OEMs") are under increasing pressure to respond to evolving customer requirements. There is a need in the market to transition the automotive industry into more integrated and sustainable business networks. To provide such support, a solution is required for the ecosystem (and customers) to extend the solution to a cloud computing environment. The framework and embodiments described herein are generic enough to integrate with automotive, or any other services, and is not tied to a specific functional or business-specific process.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
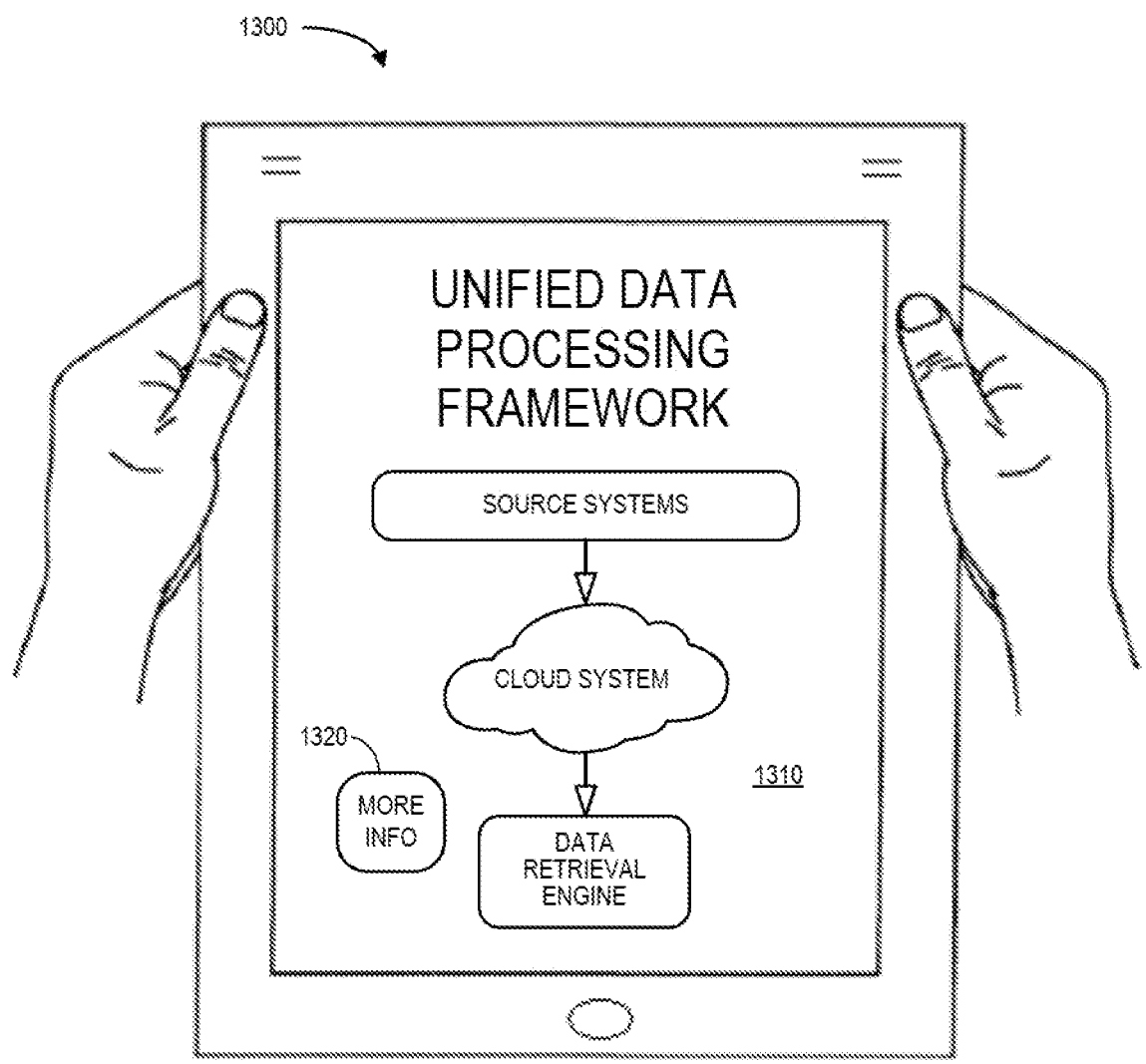
FIG. 13 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of API specifications, any of the embodiments described herein could be applied to other types of API specifications. Moreover, the displays shown herein are provided only as examples, and any other type of user interface could be implemented. For example, FIG. 13 shows a handheld tablet computer 1300 rendering a unified data processing framework display 1310 that may be used to view or adjust existing system framework components and/or to request additional data (e.g., via a "More Info" icon 1320).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system associated with a unified data processing framework, comprising:
  a Graph Query Language ("GraphQL") source system containing first data associated with a first Application Programming Interface ("API") specification;
  a remote procedure-oriented Simple Object Access Protocol ("SOAP") source system containing second data associated with a second API specification, different from the first API specification;
  a cloud system processing layer, coupled to the GraphQL and SOAP source systems, including:
    a computer processor, and a computer memory, coupled to the computer processor, storing instructions that, when executed by the computer processor cause the cloud system processing layer to:
(i) receive the first data and the second data,
(ii) parse the first data and the second data to capture entity metadata that is provided to a semantic model generator via structure normalization,
(iii) convert the first data and the second data into a universal and extendable data format having nodes arranged in accordance with the metadata, wherein each node includes inferred attributes automatically generated by a Machine Learning ("ML") algorithm analytics and inference engine, a node identifier, and next node identifiers, and
(iv) store the converted first and second data in an enterprise data lake supporting multi-modal cloud storage, wherein the converted first and second data are associated with a Representational State Transfer ("REST") architecture Hypermedia as the Engine of Application State ("HATEOAS"); and a data retrieval engine to retrieve information from the enterprise data lake, including information associated with both the first and second data, in response to a user query, wherein the cloud system processing layer and universal and extendable data format support collaborative editing such that each of a plurality of users edit a local version of a master file, representing the converted first and second data, without enforcing a minimum unit of work.

2. The system of claim 1, wherein the cloud system processing layer further supports API specifications associated with at least one of: (i) Open Data Protocol ("OData") V2, (ii) OData V4, (iii) Hyper-Text Transfer Protocol ("HTTP"), (iv) JavaScript Object Notation ("JSON")-Linked Data ("LD"), and (v) Hypertext Application Language ("HAL").

3. The system of claim 1, wherein the nodes further include all of:
(i) attributes, (ii) a signature, (iii) node metadata, and (iv) extendable attributes.

4. The system of claim 1, wherein the cloud system processing layer is further to perform structural normalization to map an internal node structure based on the entity metadata.

5. The system of claim 4, wherein the cloud system processing layer is further to apply semantic model generators associated with each of: (i) a transactional and operational data type, (ii) an unstructured data type, (iii) a time series data type, and (iv) an analytical data type.

6. The system of claim 1, wherein the data retrieval engine is associated with at least one of: (i) HTTP query retrieval, and (ii) binary bulk retrieval.

7. The system of claim 1, wherein the cloud system processing layer and universal and extendable data format store the converted first and second data in binary format to support serialization.

8. A method associated with a unified data processing framework, comprising:
receiving, by a computer processor of a cloud system processing layer from a Graph Query Language ("GraphQL") source system, first data associated with a first Application Programming Interface ("API") specification;
receiving, by the computer processor of the cloud system processing layer from a remote procedure-oriented Simple Object Access Protocol ("SOAP") source system, second data associated with a second API specification, different from the first API specification;
parsing the first data and the second data to capture entity metadata that is provided to a semantic model generator via structure normalization;
converting the first data and the second data into a universal and extendable data format having nodes arranged in accordance with the metadata, wherein each node includes inferred attributes automatically generated by a Machine Learning ("ML") algorithm analytics and inference engine, a node identifier, and next node identifiers;
storing the converted first and second data in an enterprise data lake supporting multi-modal cloud storage, wherein the converted first and second data are associated with a Representational State Transfer ("REST") architecture Hypermedia as the Engine of Application State ("HATEOAS"); and
retrieving information from the enterprise data lake, including information associated with both the first and second data, responsive to a user query from a data retrieval engine, wherein the cloud system processing layer and universal and extendable data format support collaborative editing such that each of a plurality of users edit a local version of a master file, representing the converted first and second data, without enforcing a minimum unit of work.

9. The method of claim 8, wherein the cloud system processing layer further supports API specifications associated with at least one of: (i) Open Data Protocol ("OData") V2, (ii) OData V4, (iii) Hyper-Text Transfer Protocol ("HTTP"), (iv) JavaScript Object Notation ("JSON")-Linked Data ("LD"), and (v) Hypertext Application Language ("HAL").

10. The method of claim 8, wherein the nodes further include all of: (i) attributes, (ii) a signature, (iii) node metadata, and (iv) extendable attributes.

11. The method of claim 8, wherein the cloud system processing layer is further to perform structural normalization to map an internal node structure based on the entity metadata.

12. The method of claim 11, wherein the cloud system processing layer is further to apply semantic model generators associated with each of: (i) a transactional and operational data type, (ii) an unstructured data type, (iii) a time series data type, and (iv) an analytical data type.

13. A non-transitory, machine-readable medium comprising instructions thereon that, when executed by a processor, cause the processor to execute operations associated with a unified data processing framework method, comprising:
receiving, by a computer processor of a cloud system processing layer from a Graph Query Language ("GraphQL") source system, first data associated with a first Application Programming Interface ("API") specification;
receiving, by the computer processor of the cloud system processing layer from a remote procedure-oriented Simple Object Access Protocol ("SOAP") source system, second data associated with a second API specification, different from the first API specification;
parsing the first data and the second data to capture entity metadata that is provided to a semantic model generator via structure normalization;
converting the first data and the second data into a universal and extendable data format having nodes arranged in accordance with the metadata, wherein each node includes inferred attributes automatically generated by a Machine Learning ("ML") algorithm analytics and inference engine, a node identifier, and next node identifiers;

storing the converted first and second data in an enterprise data lake supporting multi-modal cloud storage, wherein the converted first and second data are associated with a Representational State Transfer ("REST") architecture Hypermedia as the Engine of Application State ("HATEOAS"); and retrieving information from the enterprise data lake, including information associated with both the first and second data, responsive to a user query from a data retrieval engine, wherein the cloud system processing layer and universal and extendable data format support collaborative editing such that each of a plurality of users edit a local version of a master file, representing the converted first and second data, without enforcing a minimum unit of work.

14. The medium of claim 13, wherein the data retrieval engine is associated with at least one of: (i) HTTP query retrieval, and (ii) binary bulk retrieval.

15. The medium of claim 13, wherein the cloud system processing layer and universal and extendable data format store the converted first and second data in binary format to support serialization.

* * * * *